(12) United States Patent
Peloquin

(10) Patent No.: US 12,384,440 B2
(45) Date of Patent: Aug. 12, 2025

(54) STROLLER PROPULSION APPARATUS

(71) Applicant: Gary Michael Peloquin, Jensen Beach, FL (US)

(72) Inventor: Gary Michael Peloquin, Jensen Beach, FL (US)

(*) Notice: Subject to any disclaimer, the term of this patent is extended or adjusted under 35 U.S.C. 154(b) by 386 days.

(21) Appl. No.: 17/747,171

(22) Filed: May 18, 2022

(65) Prior Publication Data

US 2022/0371644 A1 Nov. 24, 2022

Related U.S. Application Data

(60) Provisional application No. 63/191,745, filed on May 21, 2021.

(51) Int. Cl.
*B62B 9/20* (2006.01)
*A63B 21/00* (2006.01)
*A63B 21/008* (2006.01)
*A63B 23/04* (2006.01)

(52) U.S. Cl.
CPC .......... *B62B 9/206* (2013.01); *A63B 21/0085* (2013.01); *A63B 21/4035* (2015.10); *A63B 21/4045* (2015.10); *A63B 23/047* (2013.01)

(58) Field of Classification Search
CPC ....... B62B 9/206; B62B 9/00; A63B 21/4035; A63B 21/4045; A63B 21/0085; A63B 23/047

See application file for complete search history.

(56) References Cited

U.S. PATENT DOCUMENTS

| | | | |
|---|---|---|---|
| 5,674,165 A | 10/1997 | Cohen et al. | |
| 6,070,889 A | 6/2000 | Handbury | |
| 6,722,689 B2 | 4/2004 | Kreamer | |
| 7,311,313 B1 * | 12/2007 | Ray | B62B 5/068 280/47.38 |
| 8,012,070 B2 * | 9/2011 | James | A63B 21/00069 482/904 |
| 10,765,185 B1 * | 9/2020 | Wengerd | F16B 2/185 |
| 2014/0008883 A1 * | 1/2014 | Litman | A63B 23/1209 280/47.38 |
| 2015/0069738 A1 | 3/2015 | Knight et al. | |
| 2020/0262463 A1 | 8/2020 | Villarreal | |

OTHER PUBLICATIONS

Strollerboards, "Stroller Handle Extensions: Helps Extend Handlebars on Baby Strollers", strollerboards.com/stroller-handle-extensions.

* cited by examiner

*Primary Examiner* — James A Shriver, II
*Assistant Examiner* — Nicholas R. Kandas
(74) *Attorney, Agent, or Firm* — William J. Connelly, III; Connelly Law PLLC

(57) ABSTRACT

Disclosed is a stroller propulsion apparatus, comprising a pair of elongated handles attached to a handlebar of a stroller. The elongated handles further comprise a grip and a resistance element. By using the grips, the user applies a pressure on the handles and the resistance element to move the handles in a forward direction and a rearward direction in a reciprocating motion propelling the stroller in the forward direction to allow a user to maintain an ergonomic positions while walking and exercising.

17 Claims, 11 Drawing Sheets

STROLLER PROPULSION APPARATUS

CROSS REFERENCE TO RELATED APPLICATION

This application claims benefit and priority to U.S. Provisional Application Ser. No. 63/191,745, filed May 21, 2021, entitled, "STROLLER PROPULSION APPARATUS" which is incorporated herein by reference in its entirety.

FIELD OF INVENTION

Embodiments disclosed herein relate, in general, to strollers, and more particularly, to a stroller propulsion apparatus.

BACKGROUND

Through the years, strollers have been designed to carry small children and infants, with a parent or an adult typically pushing the stroller from the rear. In addition, most parents often look to incorporate physical fitness such as walking, jogging, and running while, at the same time, pushing the stroller having a child seated securely in the stroller. Traditional strollers are configured with multiple wheels that enable the parents to walk and run while pushing the stroller. However, traditional strollers often inhibit an adult's natural arm rhythm as the adult pushes the stroller forward by a traditional stationary push bar type handle. In addition, pushing a stroller with a fixed push bar handle can become uncomfortable particularly while engaging in running, walking or jogging as the user's arm movement and customary arm swing is limited.

While a variety of push strollers are available, none address a positional dependence in relation to a natural movement of the adult's arms while pushing the stroller. Moreover, none of these strollers offer a variety of handle positions to allow a user to adjust the handles to multiple positions that are comfortable for securing and propelling the stroller while allowing for more ergonomic and comfortable arm movement.

Therefore, there is a need for an improved stroller propulsion apparatus that enables users to walk and run in a natural fashion while safely maintaining the control, security and a maneuverability of the stroller and the child.

SUMMARY

Embodiments in accordance with the present invention provide a stroller propulsion apparatus comprising an elongated handle attached to a handlebar of a stroller through a clamping means such that the elongated handle is moved in a forward direction and a rearward/backward direction in a reciprocating motion, wherein the movement of the elongated handle is enabled by a pressure applied through a swinging motion of the arms of the user. The apparatus further comprises a handle grip attached to a top end of the elongated handle, to be gripped by a user to apply a pressure on the top end of the elongated handle to move the elongated handle in a forward direction and a rearward direction. The stroller propulsion apparatus of the present invention further comprises a sliding tube mounted over the corresponding elongated handle to be moved in an upward direction and a downward direction. The sliding tube comprises a resistance element to be stretched and compressed for propelling the stroller in the forward direction. In a preferred embodiment of the present invention, the resistance element is pneumatic having varying resistance. The apparatus further comprising a pneumatic valve at the top end of each of the pair of elongated handles, to vary the pneumatic resistance.

In another embodiment of the present invention, stroller propulsion apparatus comprises a pair of elongated handles which are moved in a forward direction and a rearward direction in a reciprocating motion, wherein the movement of the elongated handle is enabled by a pressure applied through a swinging motion of the arms of the user. In an embodiment of the present invention, the stroller propulsion apparatus of the present invention further comprises a sliding tube mounted over the corresponding pair of elongated handles to be moved in an upward direction and a downward direction based on the direction of the movement of the corresponding pair of handles. The sliding tube of each handle comprises a resistance element to be stretched and compressed for propelling the stroller in the forward direction. The apparatus further comprises handle grips attached to a top end of the elongated handles, to be gripped by a user to apply a pressure on the top end of the elongated handles to move the elongated handle in a forward direction and a rearward direction in a reciprocating motion. In a preferred embodiment of the present invention, the resistance element is pneumatic having varying resistance. The apparatus further comprising a pneumatic valve provided at the top end of each of the pair of elongated handles, to vary the pneumatic resistance.

Embodiments in accordance with the present disclosure further provide a stroller propulsion apparatus comprising a pair of elongated handles attached to a handlebar of a stroller through a clamping means. In an embodiment of the present invention, the clamping means may comprise a C clamp, a V clamp or any comparable means of attachment. The apparatus further comprises a handle grip of a round shaped structure attached to a top end of the corresponding pair of elongated handles wherein the handle grip is gripped by a user to apply a pressure on the top end of the pair of elongated handles to move the pair of elongated handles in a forward direction and a rearward direction in a reciprocating motion. In another embodiment of the present invention, a sliding tube is mounted over each of the corresponding pair of elongated handles, to be moved in an upward direction and a downward direction based on the direction of a movement of the corresponding pair of elongated handles. The sliding tube comprises a resistance element to be stretched and compressed for propelling the stroller in the forward direction. In a preferred embodiment of the present invention, the resistance element is a piston. In an additional embodiment of the present invention, the resistance element is self-adjusting and will expand to its original uncompressed state.

Embodiments in accordance with the present invention further provide a method of operating a stroller propulsion apparatus for propelling a stroller while performing exercise activities. The method comprises the steps enabling a movement of a pair of elongated handles in a forward direction and a rearward direction in a reciprocating motion based on a pressure applied on the pair of elongated handles by a swinging motion of arms of a user; enabling the movement of a sliding tube of the corresponding pair of elongated handles in a downward direction and an upward direction based on the direction of the movement of the pair of elongated handles; and stretching and compressing a resistance element of the respective pair of elongated handles for propelling the stroller, based on the direction of the movement of the sliding tube of the corresponding pair of elongated handles.

Embodiments of the present invention may provide a number of advantages depending on its particular configuration. Embodiments of the present invention may provide a stroller propulsion apparatus that comprises a pair of elongated handles to enable users to exercise in a better anatomical and a comfortable position during an act of pushing a stroller.

Further, embodiments of the present invention may provide a stroller propulsion apparatus that enables a user to propel a stroller forward by utilizing a natural arm swing and biomechanics while walking, jogging or running. Next, embodiments of the present invention may provide a stroller propulsion apparatus that enables a user to walk and run in a natural fashion while safely maintaining a control and a maneuverability of a stroller with a child secured inside the stroller. Embodiments of the present invention are directed to a stroller propulsion apparatus that comprises a pair of elongated handles designed to be rotatably attached to a handlebar of a stroller for enabling a 360-degree movement of the pair of elongated handles.

Further, embodiments of the present invention may provide a stroller propulsion apparatus that enables a user to propel, steer and stop a stroller.

Additional embodiments of the present invention provide a stroller propulsion apparatus that comprises a pair of elongated handles that are detachably attached to a handlebar of a stroller, to remove the pair of elongated handles conveniently, when not in use.

Further embodiments of the present invention provide a stroller propulsion apparatus that comprises a pair of foldable handles that may lie down either parallel to or perpendicular to the handlebar of a stroller, when an ordinary use of the pair of handles is desired.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

Figure 1A:
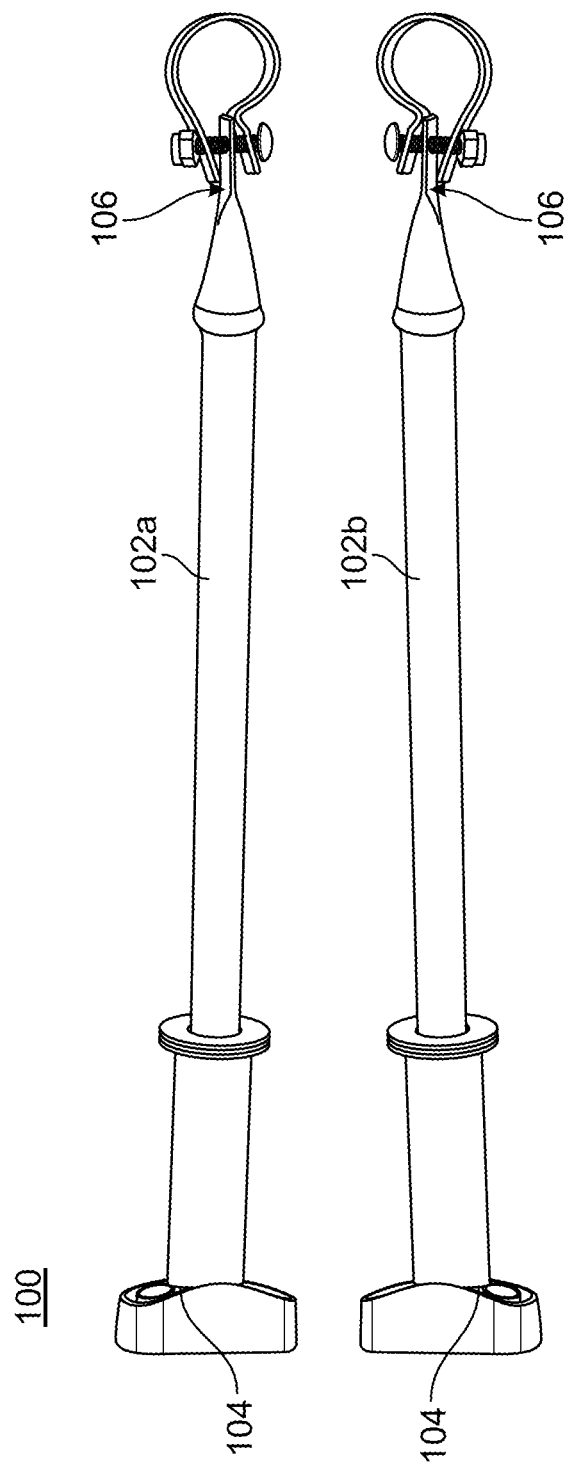
FIG. 1A illustrates a side view of a stroller propulsion apparatus, according to an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be described below in conjunction with an exemplary stroller propulsion apparatus. Embodiments of the present invention are not limited to any particular type of a stroller propulsion apparatus. Those skilled in the art will recognize the disclosed techniques may be used in any stroller propulsion apparatus.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Figure 1C:
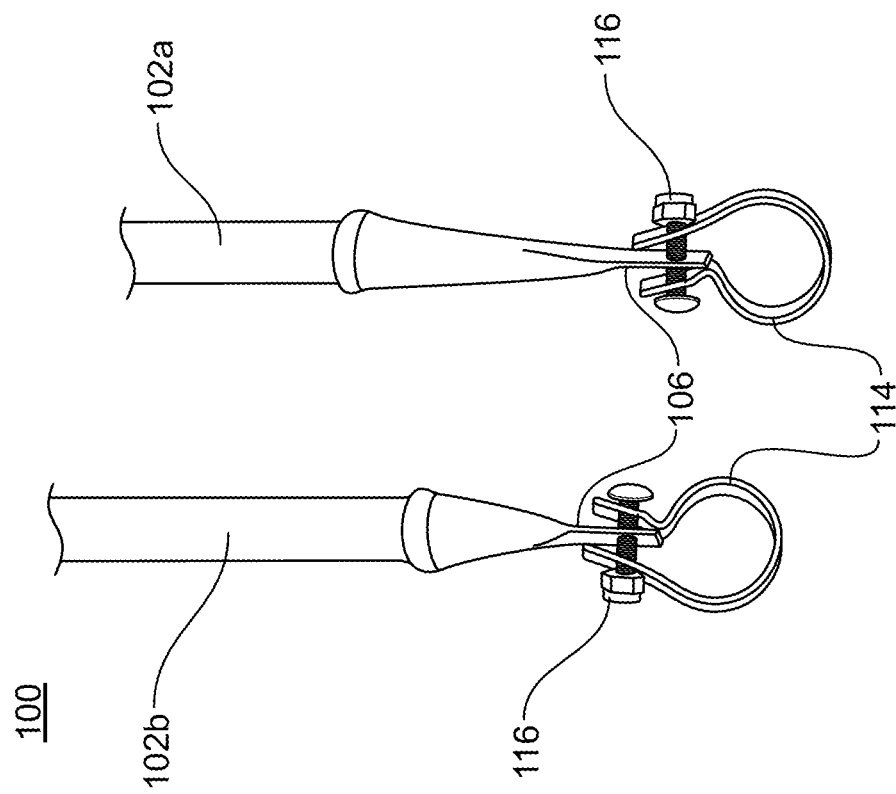
FIG. 1C illustrates a sectional view of a bottom end of the pair of elongated handles of the stroller propulsion apparatus, according to an embodiment of the present invention.

FIG. 1A illustrates a side view of a stroller propulsion apparatus 100 (hereinafter referred to as the apparatus 100), according to an embodiment of the present invention. The apparatus 100 may be designed to enable a user to propel, steer and stop a traditional stroller 124 (as shown in FIG. 1K) (hereinafter referred to as the stroller 124) while engaging in exercise activities. The exercise activities may be, such as, but not limited to, running, jogging, walking, and so forth, in an embodiment of the present invention. Embodiments of the present invention are intended to include or otherwise cover any type of the exercise activities. Further, the apparatus 100 may be designed to enable the user to perform the exercise activities in a better anatomical and a comfortable position during an act of propelling the stroller 124. The apparatus 100 may also be designed to enable the user to walk and run in a natural fashion while maintaining control and maneuverability of the stroller 124 while a child sitting in the stroller 124. According to embodiments of the present invention, the apparatus 100 may comprise a pair of elongated handles 102a-102b (hereinafter referred to as the handles 102). In another embodiment of the present invention, the apparatus 100 may comprise a single handle 102. In an embodiment of the present invention, the handles 102 may be moved in opposite directions such as, a forward direction and a rearward direction in a reciprocating motion with a natural swinging motion of arms of the user, while performing any of the exercise activities. In an embodiment of the present invention, when a first arm of the user is extended in the forward direction, the movement of a first handle 102a will also be in the forward direction. In such embodiment of the present invention, the first handle 102a may be one of, the handles 102 that may be gripped by the hands of the user. Concurrently, when a second arm of the user is retracted in the rearward direction, this will enable the movement of a second handle 102b in the rearward direction. In such embodiment of the present invention, the second handle 102b may be one, of the handles 102 that may be gripped by the corresponding hand of the user. According to an embodiment of the present invention, the movement of the handles 102 in the opposite directions may propel the stroller 124 in the forward direction.

In an embodiment of the present invention, the handles 102 may be made up of a material such as, but not limited to, a polycarbonate, an Acrylonitrile Butadiene Styrene (ABS), and so forth. Embodiments of the present invention are intended to include or otherwise cover any material of the handles 102, including known, related art, and/or later developed technologies. According to an embodiment of the present invention, an outer body of each of the handles 102 may be coated with a pre-defined color. In a preferred embodiment of the present invention, the pre-defined color may be a copper color. Embodiments of the present invention are intended to include or otherwise cover any color of the outer body of each of the handles 102.

In an embodiment of the present invention, the handles 102 may be detachably attached to a frame of the stroller 124 shown in FIG. 1K. In another embodiment of the present invention, the handles 102 may be fixedly attached to the frame of the stroller 124. In yet another embodiment of the present invention, the handles 102 may be attached to a handlebar (not shown) of the stroller 122. Further, in an embodiment of the present invention, the handles 102 may be detachably attached to the handlebar 126 of the stroller 124 (as shown in FIG. 1L). In such embodiment of the present invention, the detachable attachment of the handles 102 to the handlebar 126 of the stroller 124 may enable the user to conveniently remove and store the handles 102, when the handles 102 are not in use. In another embodiment of the present invention, the handles 102 may be fixedly attached to the handlebar 126 of the stroller 124. In yet another embodiment of the present invention, the handles 102 may be rotatably attached to the handlebar 126 of the stroller 124. In such embodiment of the present invention, the rotatable attachment of the handles 102 may enable a 360-degree movement of the handles 102 with respect to the handlebar 126 of the stroller 124. The 360-degree movement of the handles 102 may enable the user to steer the stroller 124 in any direction. In another embodiment of the present invention, the handles 102 may be pivotally attached to the handlebar 126 of the stroller 124 at a pivot point (not shown). Similarly, in an embodiment of the present invention, a single handle 102 may be attached to the stroller 124 in a similar fashion, as described above.

According to an embodiment of the present invention, each of the handles 102 may have a top end 104 and a bottom end 106. In an embodiment of the present invention, the top end 104 of each of the handles 102 may be folded down, to place the handles 102 parallel to the handlebar 126 of the stroller 124. In such embodiment of the present invention, the top end 104 of each of the handles 102 may be folded down when an ordinary use of the handles 102 is desired. As used herein, the term "ordinary use" refers to an act of gripping and pushing the handles 102 to move the stroller 124 from a first point to a second point. In another embodiment of the present invention, each of the handles 102 may be folded down, to place the handles 102 parallel to the frame of the stroller 124, when the handles 102 are not in use. In another embodiment of the present invention, the handles 102 of the stroller propulsion apparatus 100 may be folded and fixed in a variety of configurations when not in use.

In an embodiment of the present invention, the handles 102 may have an adjustable length. In an embodiment of the present invention, the handles 102 may comprise external rods that may accommodate corresponding internal rods having a diameter lesser than the external rods to increase and/or decrease a length of the handles 102. The handles 102 may further comprise a locking mechanism (not shown) for locking the internal rods relative to the external rods in place. The locking mechanism may include a cam lock, a clutch lock, and so forth. Embodiments of the present invention are intended to include or otherwise cover any type of the locking mechanism, including known, related art, and/or later developed technologies. In another embodiment of the present invention, the apparatus 100 may comprise a telescopic ring (not shown) that may be arranged over each of the handles 102 to increase and/or decrease the length of the handles 102 based on a requirement. In an embodiment of the present invention, the length of the handles 102 may be adjusted by twisting off the telescopic ring to further enable the user to partially pull out the internal rods that may be inside the corresponding handles 102 to increase the length of the handles 102.

Figure 1B:
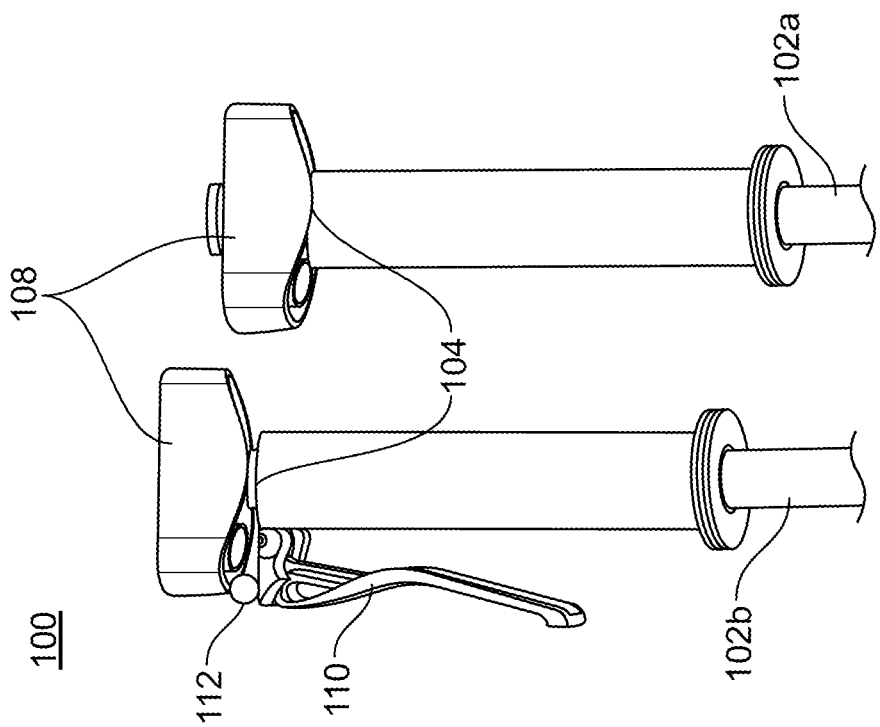
FIG. 1B illustrates a sectional view of a top end of a pair of elongated handles of the stroller propulsion apparatus, according to an embodiment of the present invention.

FIG. 1B illustrates a sectional view of the top end 104 of the handles 102 of the apparatus 100, according to an embodiment of the present invention. In an embodiment of the present invention, the apparatus 100 may comprise a handle grip 108 that may be attached to the top end 104 of the corresponding handles 102 through a fastening means (not shown). The fastening means may include nuts, studs, screws, and so forth. Embodiments of the present invention are intended to include or otherwise cover any type of the fastening means, including known, related art, and/or later developed technologies. In an embodiment of the present invention, the handle grip 108 may be having an alignment hole (not shown) to accept a portion of the top end 104 of the corresponding handles 102 for enabling the handle grip 108 to be attached to the top end 104 of the corresponding handles 102.

Further, in an embodiment of the present invention, the handle grip 108 may be of any shape such as, but not limited to, a cylindrical shape, a square shape, a flat shape, and so forth. In a preferred embodiment of the present invention, the handle grip 108 may be of a T-shape. Embodiments of the present invention are intended to include or otherwise cover any shape of the handle grip 108, including known, related art, and/or later developed technologies. The handle grip 108 may be made up of a material such as, but not limited to, a nylon, a phenolic, a Thermoplastic Elastomer (TPE), a Polypropylene (PP), a Low-Density Polyethylene (LDP), an aluminum, a stainless steel, a brass, and so forth. Embodiments of the present invention are intended to include or otherwise cover any material of the handle grip 108, including known, related art, and/or later developed technologies.

According to an embodiment of the present invention, the handle grip 108 of the corresponding handles 102 may be gripped by the user to apply a pressure on the top end 104 of the corresponding handles 102 to move the handles 102 in the forward direction and the rearward direction. In an embodiment of the present invention, the pressure applied on the top end 104 of the corresponding handles 102 may propel the stroller 124 in the forward direction. In an alternative embodiment of the present invention, the top end 104 of at least one of, the handles 102 may comprise a handle brake 110 that may be squeezed by the user to lock a current position of the handles 102, to prevent the stroller 124 from moving. The handle brake 110 may comprise a lock button 112 that may be used to maintain a locked state of the handles 102, in an embodiment of the present invention. The handle brake 110 may be squeezed again to unlock the locked position of the handles 102, in an embodiment of the present invention.

FIG. 1C illustrates a sectional view of the bottom end 106 of the handles 102 of the apparatus 100, according to an embodiment of the present invention. In an embodiment of the present invention, the bottom end 106 of each of the handles 102 may have a mounting hole (not shown) that may be punched to accept a clamping means 114. In such embodiment of the present invention, the bottom end 106 of each of the handles 102 may be attached to corresponding ends of the handlebar 126 of the stroller 124 at a pivot point through the clamping means 114. As used herein, the "pivot point" refers to a mounting point that may be extended outwards on the corresponding ends of the handlebar 126 of the stroller 124 to receive the clamping means 114 of the corresponding handles 102 for attaching the handles 102 to the handlebar 126 of the stroller 124. In another embodiment of the present invention, the bottom end 106 of each of the handles 102 may have a plain surface that may be of any shape such as, but not limited to, a round shape, a square shape, and so forth. Embodiments of the present invention are intended to include or otherwise cover any shape of the plain surface, including known, related art, and/or later developed technologies. In such embodiment of the present invention, the clamping means 114 may be mounted on the pivot point at the corresponding ends of the handlebar 126 of the stroller 124 and may further attach the bottom end 106 having the plain surface of the handles 102 to the pivot point of the corresponding ends of the handlebar 126 of the stroller 124 through the mounted clamping means 114. In an embodiment of the present invention, a diameter of the clamping means 114 may depend on a size of the pivot point that may be provided to accept the clamping means 114.

The clamping means 114 may be, but not limited to, a pipe clamp, a locking clamp, a ratcheting bar clamp, and so forth. In a preferred embodiment of the present invention, the clamping means 114 may be, a quick release clamp such as, a V clamp. Embodiments of the present invention are intended to include or otherwise cover any type of the clamping means 114, including known, related art, and/or later developed technologies. The clamping means 114 may be made up of a material such as, but not limited to, a metal, the stainless steel, and so forth. Embodiments of the present invention are intended to include or otherwise cover any material of the clamping means 114, including known, related art, and/or later developed technologies.

According to an embodiment of the present invention, the clamping means 114 may comprise a screw 116 that may be loosened to detach the handles 102 from the handlebar 126 of the stroller 124. In another embodiment of the present invention, the screw 116 may be tightened to attach the handles 102 to the handlebar 126 of the stroller 124.

Figure 1D:
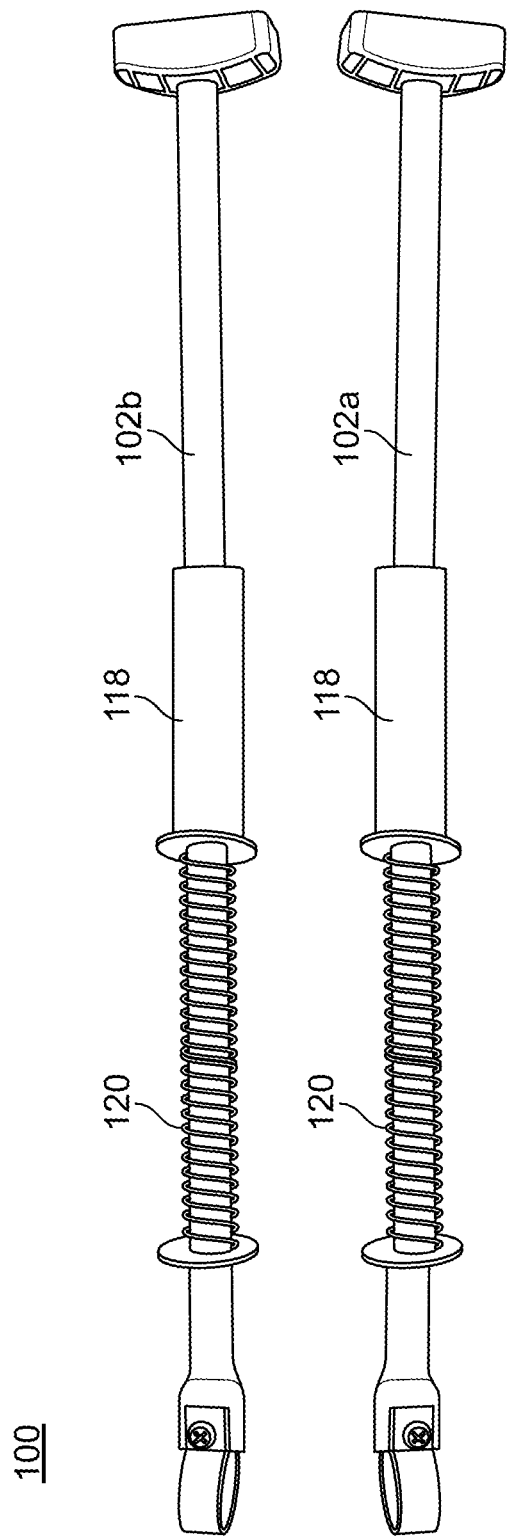
FIG. 1D illustrates an expanded side view of the pair of elongated handles of the stroller propulsion apparatus, according to an embodiment of the present invention.

FIG. 1D illustrates an expanded view of the handles 102 of the apparatus 100, according to an embodiment of the present invention. In an embodiment of the present invention, the apparatus 100 may comprise a sliding tube 118 that may be mounted over the corresponding handles 102. The sliding tube 118 may be slid in one of, an upward direction or a downward direction based on the direction of the movement of the corresponding handles 102. In an embodiment of the present invention, the sliding tube 118 of the first handle 102*a* may be slid in the downward direction, when the direction of the movement of the first handle 102*a* is the forward direction. Concurrently, the sliding tube 118 of the second handle 102*b* may be slid in the upward direction, when the direction of the movement of the second handle 102*b* is the rearward direction. In another embodiment of the present invention, the sliding tube 118 of the second handle 102*b* may be slid in the downward direction, when the direction of the movement of the second handle 102*b* is the forward direction. Concurrently, the sliding tube 118 of the first handle 102*a* may be slid in the upward direction, when the direction of the movement of the first handle 102*a* is the rearward direction. The sliding tube 118 may be made up of a material such as, but not limited to, a rubber, a steel, the aluminum, and so forth. Embodiments of the present invention are intended to include or otherwise cover any material of the sliding tube 118, including known, related art, and/or later developed technologies.

According to an embodiment of the present invention, each of the sliding tube 118 may comprise a resistance element 120 that may be stretched or compressed, based on the direction of the movement of the sliding tube 118 of the corresponding handles 102, which may further be responsible for propelling the stroller 124 in the forward direction. In an embodiment of the present invention, the resistance element 120 may be adjustable to vary the resistance strength for different users. In an embodiment of the present invention, the resistance element 120 of the first handle 102a may be compressed, when the sliding tube 118 of the first handle 102a slid in the downward direction. Concurrently, the resistance element 120 of the second handle 102b may be stretched due to sliding of the sliding tube 118 of the second handle 102b in the upward direction. In another embodiment of the present invention, the resistance element 120 of the second handle 102b may be compressed, when the sliding tube 118 of the second handle 102b slid in the downward direction. Concurrently, the resistance element 120 of the first handle 102a may be stretched and/or compressed due to sliding of the sliding tube 118 of the first handle 102a in the upward direction.

Further, in an embodiment of the present invention, the stretching and compressing of the resistance element 120 may provide a resistance against the movement of the handles 102 in the forward direction and the rearward direction. In an embodiment of the present invention, the resistance element 120 may provide a greater resistance against the movement of one of the handles 102 in the forward direction than against the movement of the corresponding handle of the handles 102 in the rearward direction to propel the stroller 124 in the forward direction. In an embodiment of the present invention, the first handle 102a may be moved in the forward direction against the greater resistance for propelling the stroller 124 in the forward direction, while moving the second handle 102b in the rearward direction against a smaller resistance. In another embodiment of the present invention, the second handle 102b may be moved in the forward direction against the greater resistance for propelling the stroller 124 in the forward direction, while moving the first handle 102a in the rearward direction against the smaller resistance.

In an embodiment of the present invention, the resistance element 120 may be an elastic cord that may be, but not limited to, rubber, bungy, and so forth. Embodiments of the present invention are intended to include or otherwise cover any type of the elastic, including known, related art, and/or later developed technologies. In another embodiment of the present invention, the resistance element 120 may be a tension spring element that provides increased resistance when compressed and decreased resistance when extended. In yet embodiment of the present invention, the resistance element 120 may be, but not limited to, friction resistance, a rolling resistance, a pneumatic resistance, bellows, and so forth. In yet another embodiment of the present invention, the resistance element 120 may be adjusted to accommodate the users of different sizes and strength.

In a preferred embodiment of the present invention, the resistance element 120 may be a piston. In such embodiment of the present invention, the movement of the first handle 102a in a direction of a motion of the stroller 124 may enable a retraction of the piston of the first handle 102a and the movement of the second handle 102b in the opposite direction of the first handle 102a may enable an extension of the piston of the second handle 102b. In another embodiment of the present invention, the movement of the second handle 102b in the direction of the motion of the stroller 124 may enable the retraction of the piston of the second handle 102b and the movement of the first handle 102a in the opposite direction of the second handle 102b may enable the extension of the piston of the first handle 102a. Embodiments of the present invention are intended to include or otherwise cover any type of the resistance element 120, including known, related art, and/or later developed technologies.

Figure 1E:
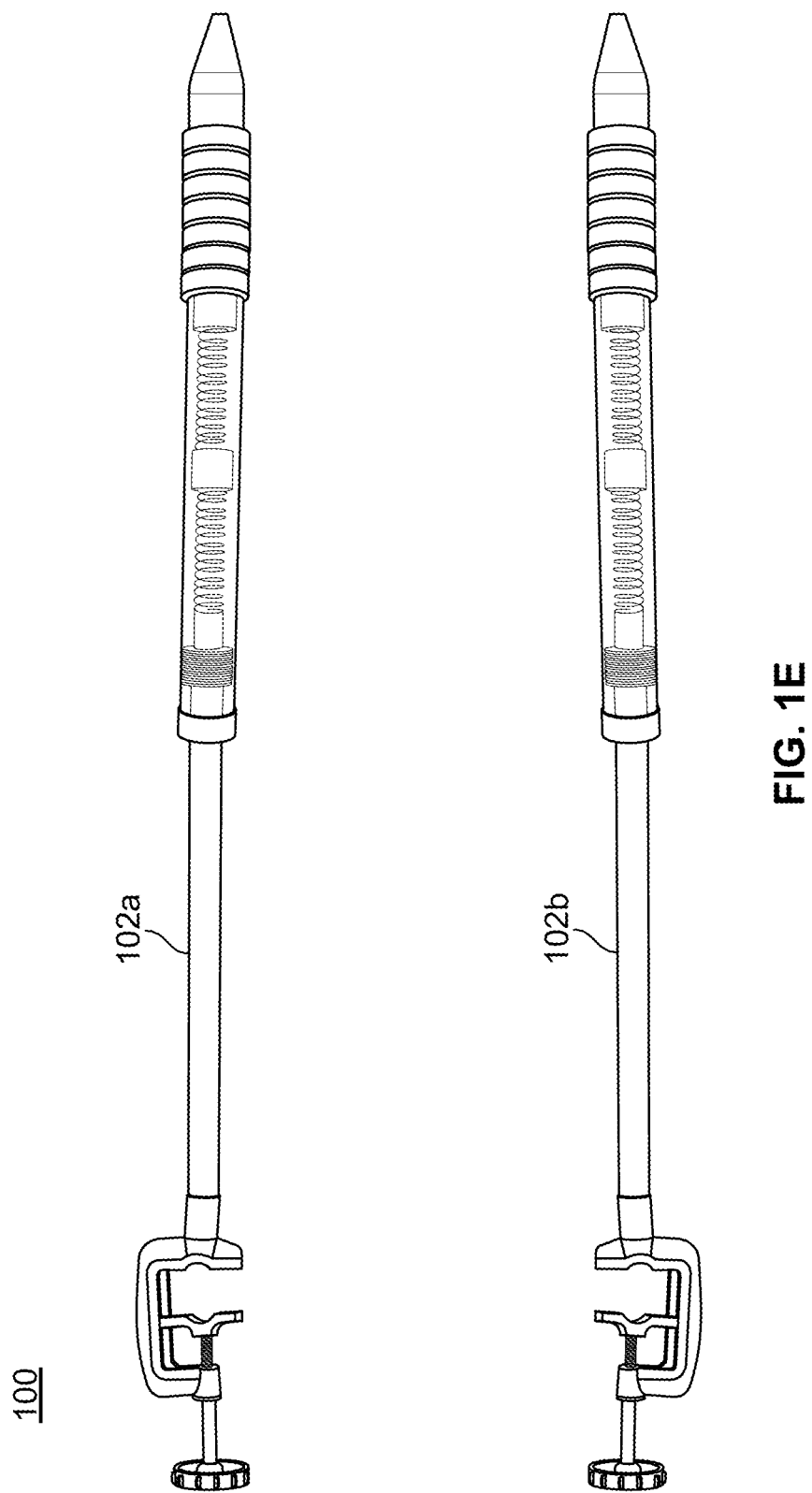
FIG. 1E illustrates a side view of the stroller propulsion apparatus, according to another embodiment of the present invention.
Figure 1G:
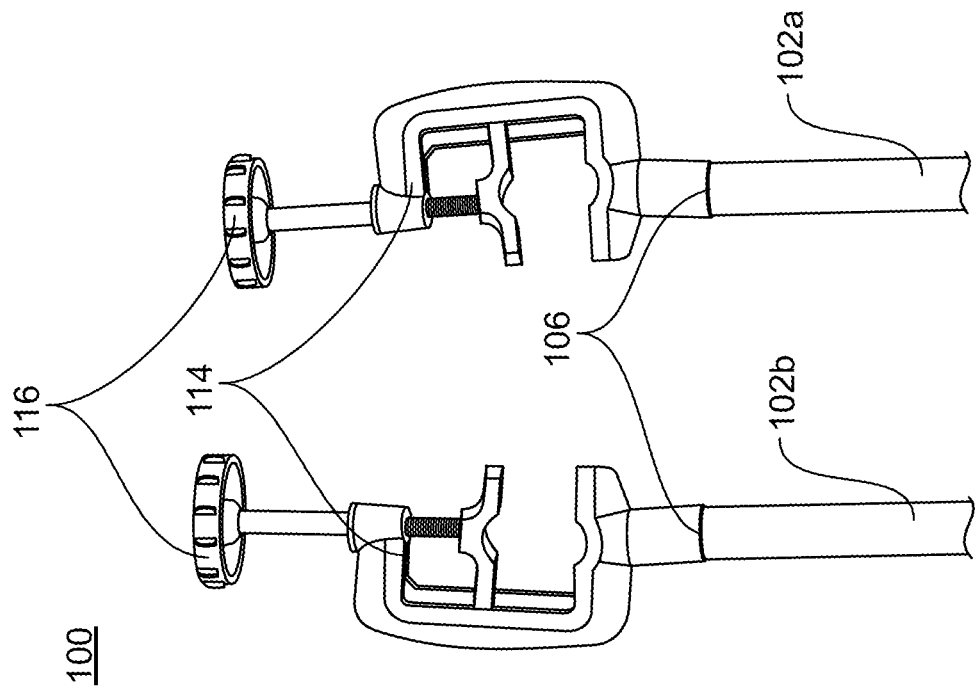
FIG. 1G illustrates a sectional view of the bottom end of the pair of elongated handles of the stroller propulsion apparatus, according to another embodiment of the present invention.

FIG. 1E illustrates a side view of the apparatus 100, according to another embodiment of the present invention. The apparatus 100 may comprise the pair of elongated handles 102. In a preferred embodiment of the present invention, the handles 102 may be made up of a plastic material. Embodiments of the present invention are intended to include or otherwise cover any material of the handles 102, including known, related art, and/or later developed technologies. Further, the outer body of the handles 102 may be coated with a pre-defined color that may be a green color, in an embodiment of the present invention. Embodiments of the present invention are intended to include or otherwise cover any color of the outer body of each of the handles 102.

Figure 1F:
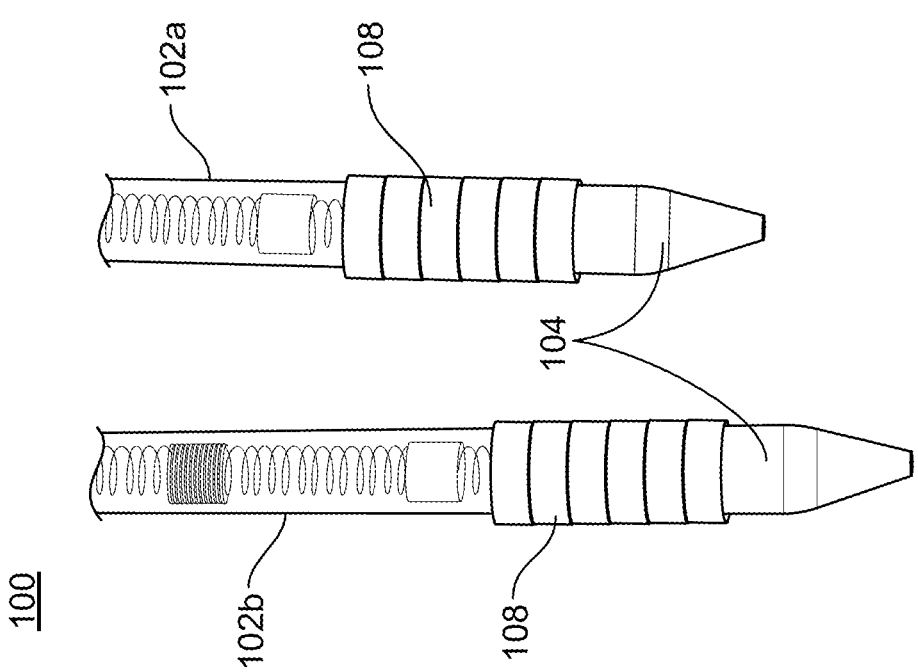
FIG. 1F illustrates a sectional view of the top end of the pair of elongated handles of the stroller propulsion apparatus, according to another embodiment of the present invention.

FIG. 1F illustrates a sectional view of the top end 104 of the handles 102 of the apparatus 100 as shown in the FIG. 1E, according to another embodiment of the present invention. In an embodiment of the present invention, each of the handles 102 may comprise the handle grip 108 that may be a ribbed handle grip. Further, in a preferred embodiment of the present invention, the handle grip 108 may be of a round shape. Embodiments of the present invention are intended to include or otherwise cover any shape of the handle grip 108, including known, related art, and/or later developed technologies.

FIG. 1G illustrates a sectional view of the bottom end 106 of the handles 102 of the apparatus 100, according to another embodiment of the present invention. In an embodiment of the present invention, the bottom end 106 of each of the handles 102 may be attached to the corresponding clamping means 114 that may be clamped over the handlebar 126 of the stroller 124, for attaching the corresponding handles 102 to the handlebar 126 of the stroller 124. In a preferred embodiment of the present invention, the clamping means 114 may be a C clamp. Further, in a preferred embodiment of the present invention, the clamping means 114 may be made up of the plastic material. According to an embodiment of the present invention, the clamping means 114 may comprise the screw 116 that may be of a wheel shaped structure. The screw 116 may be loosened to detach the handles 102 from the handlebar 126 of the stroller 124. In another embodiment of the present invention, the screw 116 may be tightened to attach the handles 102 to the handlebar 126 of the stroller 124 for the desired amount of time.

Figure 1H:
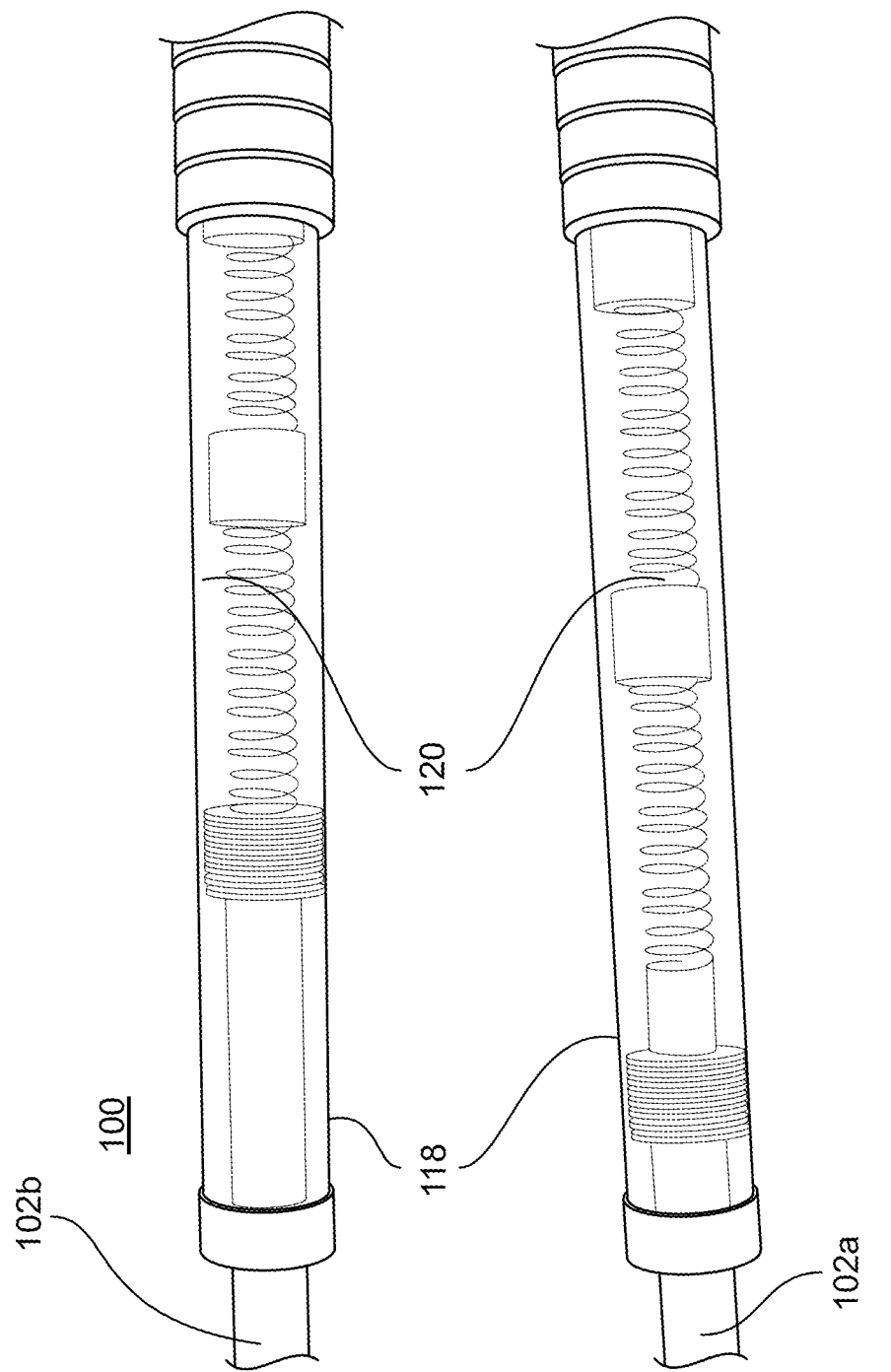
FIG. 1H illustrates a partial view of a sliding tube of the pair of elongated handles of the stroller propulsion apparatus, according to another embodiment of the present invention.

FIG. 1H illustrates a partial view of the sliding tube 118 of the handles 102 of the apparatus 100, according to another embodiment of the present invention. In a preferred embodiment of the present invention, the sliding tube 118 may be made up of the plastic material. Embodiments of the present invention are intended to include or otherwise cover any material of the sliding tube 118, including known, related art, and/or later developed technologies. Further, the sliding tube 118 of each of the handles 102 may comprise the resistance element 120 that may be compressed and stretched to propel the stroller 124, based on the pressure applied by the user on the corresponding handles 102, as discussed above.

Figure 1I:
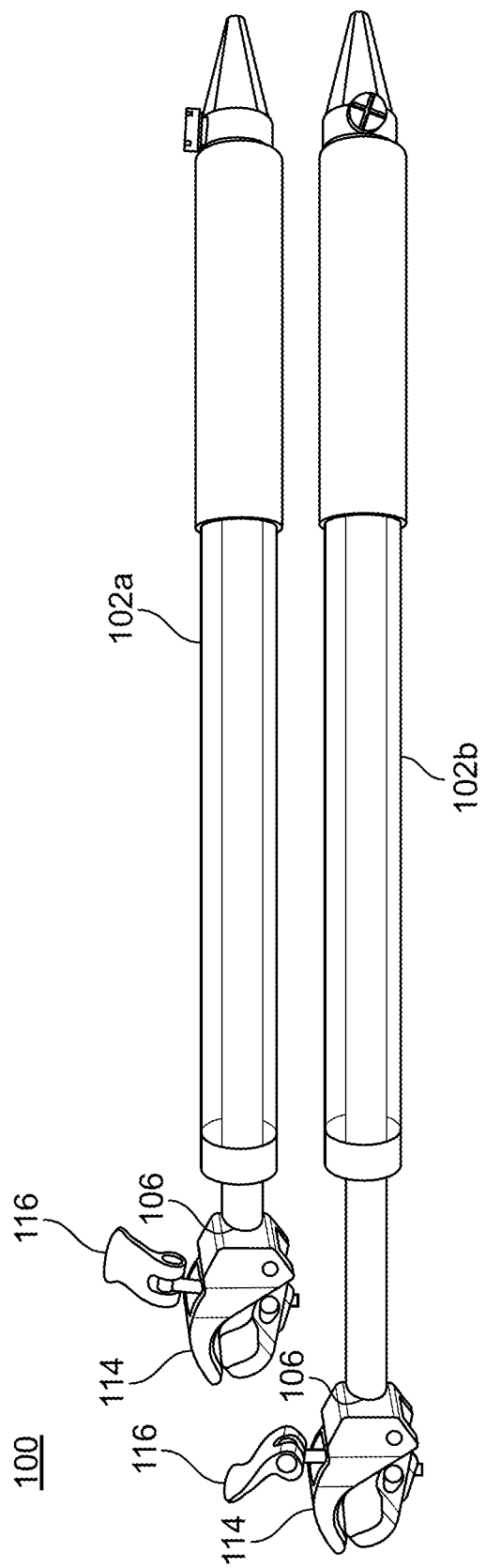
FIG. 1I illustrates a side view of the stroller propulsion apparatus, according to yet another embodiment of the present invention.

FIG. 1I illustrates a top side of the apparatus 100 according to yet another embodiment of the present invention. In an embodiment of the present invention, a clamp 114 may be attached to the bottom end 106 of each of the handles 102. In a preferred embodiment of the present invention, the clamp further comprises a locking lever 116 that may enable rapid clamping and releasing of the apparatus 100 to and from the handlebar 126 of the stroller 124.

Figure 1J:
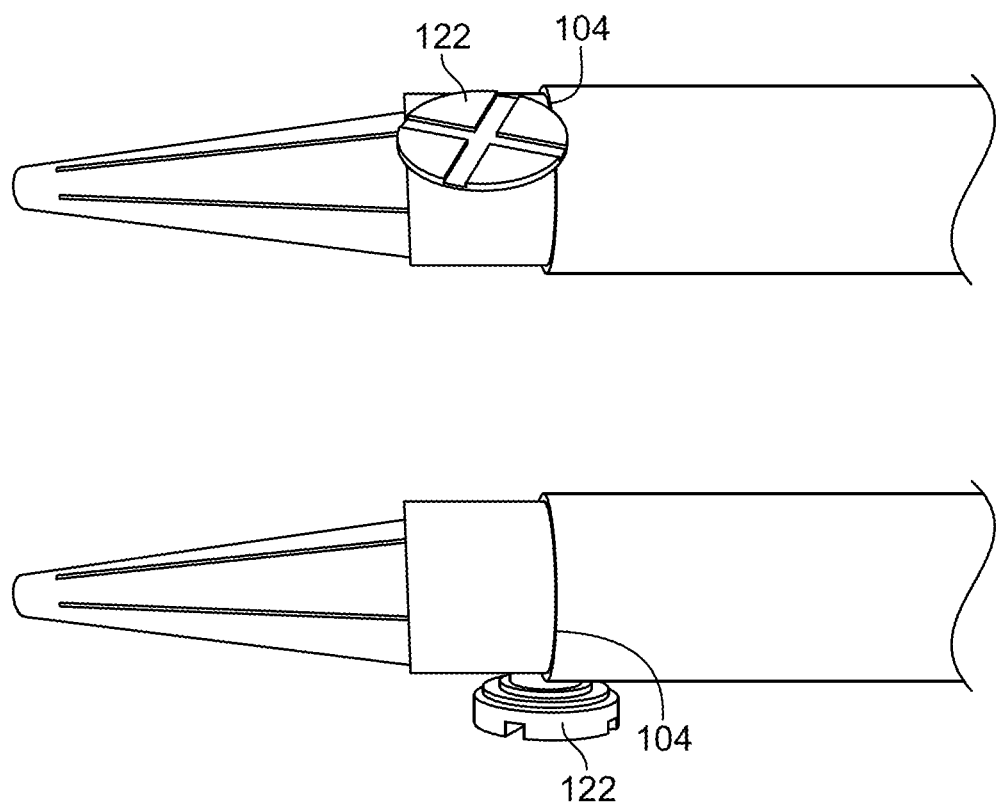
FIG. 1J Illustrates a sectional view of the top end of the elongated handles of the stroller apparatus as shown in FIG. 1I according to an embodiment of the present invention.
Figure 1K:
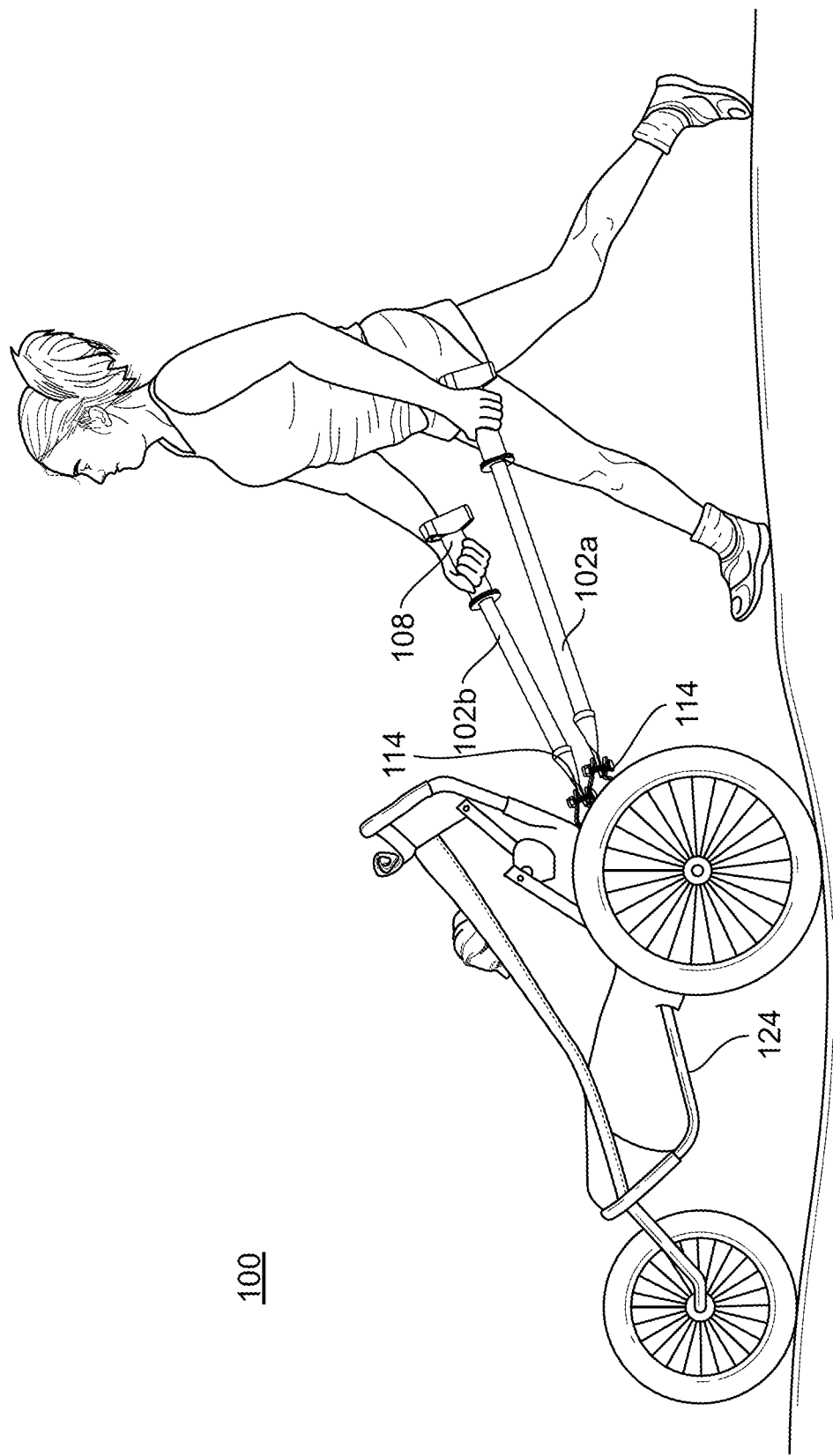
FIG. 1K illustrates an exemplary embodiment of the stroller propulsion apparatus, according to an embodiment of the present invention.
Figure 1L:
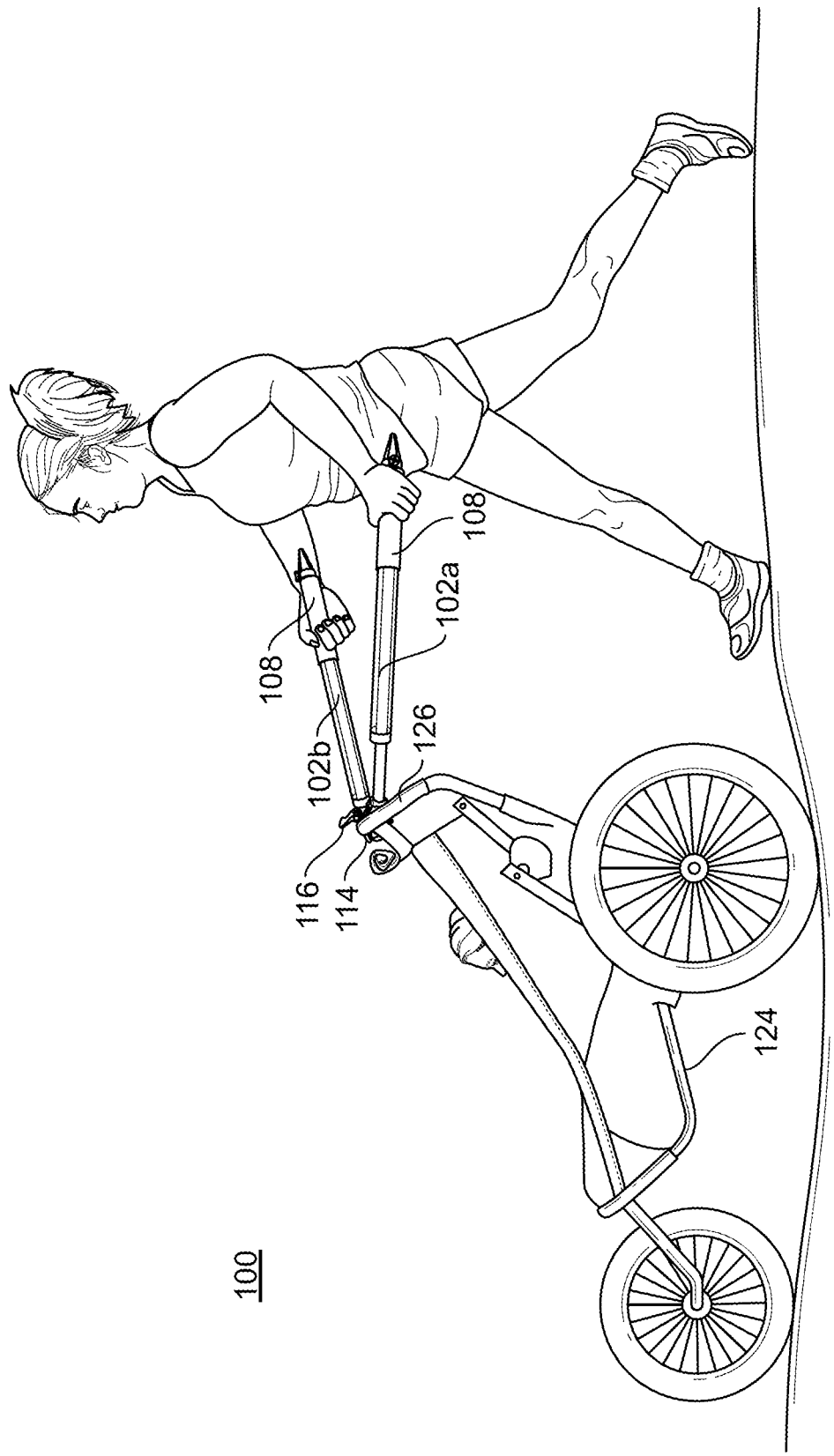
FIG. 1L illustrates another exemplary embodiment of the stroller propulsion apparatus according to another embodiment of the present invention.

FIG. 1J illustrates a sectional view of the top end of the handles of the apparatus 100 as shown in FIG. 1I according to another embodiment of the present invention. In an embodiment of the present invention, the top end 104 of each of the handles 102 may comprise a pneumatic valve 122 operated by the user to vary the resistance that may be provided by the resistance element 120 against the movement of one of, the handles 102 in one of, the forward direction or the rearward direction.

FIG. 1K illustrates an exemplary embodiment of the apparatus 100, according to an embodiment of the present invention. In an embodiment of the present invention, the apparatus 100 may be attached to the frame of the stroller 124 through the clamping means 114 to enable the user to walk in the better anatomical and the comfortable position during the act of propelling the stroller 124. The user may grip the handle grip 108 of the handles 102 by corresponding hands to move the handles 102 in the opposite direction. The user may move the handles 102 in the opposite direction to propel the stroller 124 in the forward direction. In an exemplary scenario, the user may extend a left arm in the forward direction to move the left handle 102a in the forward direction. Similarly, the user may retract a right arm in the rearward direction to move the right handle 102b in the rearward direction.

FIG. 1L illustrates another exemplary embodiment of the apparatus 100, according to another embodiment of the present invention. In an embodiment of the present invention, the apparatus 100 may be attached to the handlebar 126 of the stroller 124. In such embodiment of the present invention, the clamping means 114 of each of the handles 102 may be placed over the handlebar 126 and clamped through the screw 116 such as, the locking lever. Further, the user may grip the handle grip 108 of the handles 102 by corresponding hands to move the handles 102 in the opposite direction. The user may move the handles 102 in the opposite direction to propel the stroller 124 in the forward direction. In an exemplary scenario, the user may extend the left arm in the rearward direction to extend the left handle 102a of the apparatus 100. Similarly, the user may extend the right arm in the forward direction to compress the right handle 102b of the apparatus 100.

Figure 2:
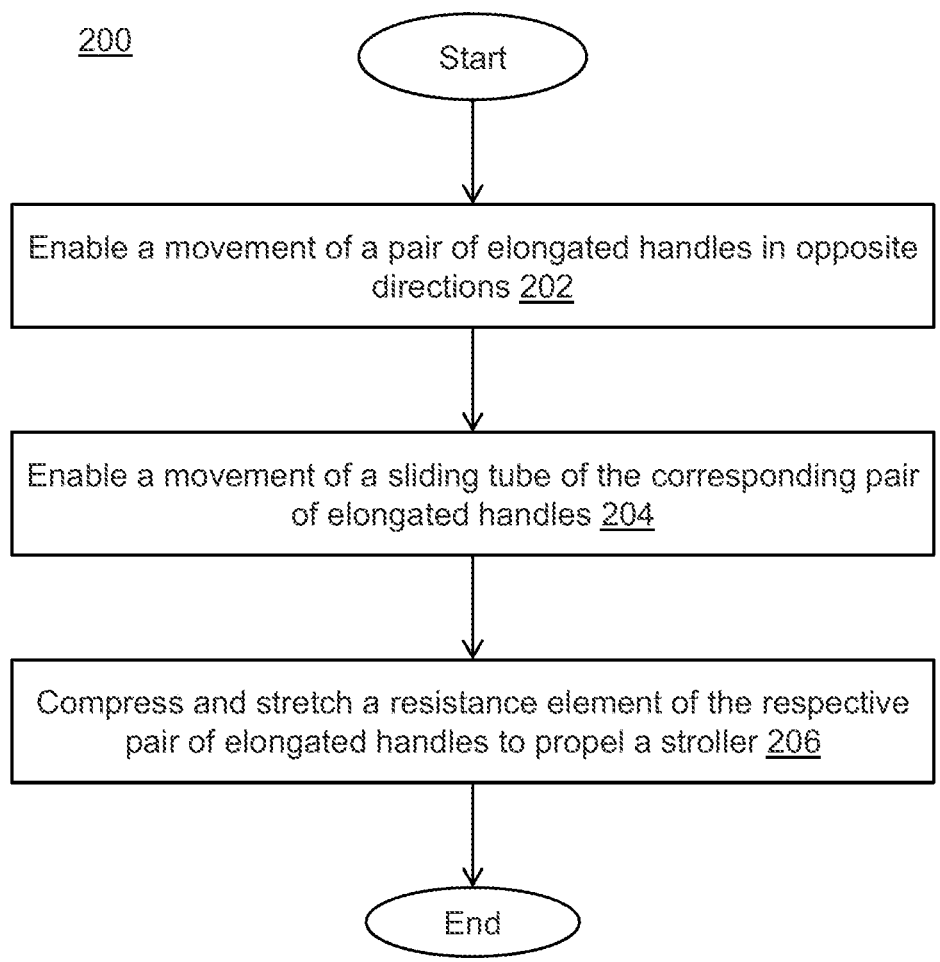
FIG. 2 illustrates a flow chart of a method of operating the stroller propulsion apparatus for propelling a stroller while performing exercise activities, according to an embodiment of the present invention.

FIG. 2 illustrates a flow chart of a method 200 of operating the apparatus 100 for propelling the stroller 124 while performing the exercise activities, according to an embodiment of the present invention.

At step 202, the apparatus 100 may enable the movement of the handles 102 in the opposite directions with the pressure applied by the swinging motion of the user's arms. As an example, if the first handle 102a is moved in the forward direction, then the second handle 102b is moved in the rearward direction and vice versa.

At step 204, the apparatus 100 may enable the movement of the sliding tube 118 that may be mounted over the corresponding handles 102 based on the direction of the movement of the corresponding handles 102. As mentioned in the above example in the step 202, the movement of the first handle 102a in the forward direction may enable the movement of the sliding tube 118 of the first handle 102a in the downward direction and the movement of the second handle 102b in the rearward direction may enable the movement of the sliding tube 118 of the second handle 102b in the upward direction.

At step 206, the apparatus 100 may enable the movement of the resistance element 120 of the corresponding handles 102 to propel the stroller 124, based on the direction of the movement of the sliding tube 118. As mentioned in the step 204, the downward movement of the sliding tube 118 of the first handle 102a may compress the resistance element 120 of the first handle 102a and the upward movement of the sliding tube 118 of the second handle 102b may stretch the resistance element 120 of the second handle 102b.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to a stroller. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A stroller propulsion apparatus, the apparatus comprising:
   an elongated handle having a top end and a bottom end, said bottom end of the elongated handle detachably attached to a handlebar of a stroller;
   a handle grip attached to the top end of the elongated handle;
   a sliding tube mounted over the elongated handle, to be moved in an upward direction and a downward direction based on the direction of a movement of the elongated handle, wherein the sliding tube comprises a resistance element to be stretched and compressed for propelling the stroller in a forward direction and a backward direction, based on the direction of the movement of the sliding tube of the elongated handle; and
   a pneumatic valve configured outside of the sliding tube and adjacent to the sliding tube, wherein the pneumatic value is configured to adjust a resistance level of the resistance element that extends vertically within the sliding tube, wherein the pneumatic value adjusts the resistance level of a spring extending vertically and a resistance level of the elongated handle extending horizontally, wherein the pneumatic valve adjusts each resistance level by changing a size of an aperture.

2. The apparatus of claim 1, wherein the bottom end of the elongated handle is detachably attached to the handlebar of the stroller by a clamp.

3. The apparatus of claim 1, wherein the handle grip comprises a T shape.

4. The apparatus of claim 1, wherein the elongated handle is foldable.

5. The apparatus of claim 1, wherein the resistance element is pneumatic.

6. The apparatus of claim 1, wherein the resistance element is adjustable.

7. The apparatus of claim 1, wherein the elongated handle is rotatably attached to the handlebar of the stroller to enable a 360-degree movement of the elongated handle with respect to the handlebar of the stroller.

8. The apparatus of claim 2, wherein the clamp of the elongated handle comprises a lever lock to secure the elongated handle to the stroller.

9. The apparatus of claim 6, wherein the resistance element is adjusted in one or more intervals by the pneumatic valve.

10. A stroller propulsion apparatus, the apparatus comprising:
    a foldable elongated handle rotatably attached to a handlebar of a stroller;
    a handle grip attached to a top end of the elongated handle wherein a user applies pressure to the top end of the elongated handle to move the elongated handle in a forward and backward direction in a reciprocating motion;
    a sliding tube mounted over the elongated handle, to be moved in an upward direction and a downward direction based on the direction of a movement of the elongated handle, wherein the sliding tube comprises a resistance element to be stretched and compressed for propelling the stroller in the forward direction based on the direction of the movement of the sliding tube of the elongated handle; and
    a pneumatic valve configured outside of the sliding tube and adjacent to the sliding tube, wherein the pneumatic value is configured to adjust a resistance level of the resistance element that extends vertically within the sliding tube, wherein the pneumatic value adjusts the resistance level of a spring extending vertically and a resistance level of the elongated handle extending horizontally, wherein the pneumatic valve adjusts each resistance level by changing a size of an aperture.

11. The apparatus of claim 10, wherein the elongated handle is detachably attached to the stroller by a clamp.

12. The apparatus of claim 10, wherein the top end of the elongated handle is folded down perpendicular to the handlebar of the stroller.

13. The apparatus of claim 10, wherein the resistance element is pneumatic.

14. The apparatus of claim 10, wherein the elongated handle is rotatably attached to the handlebar of the stroller to enable a 360-degree movement of the elongated handle with respect to the handlebar.

15. The apparatus of claim 10, wherein the elongated handle is detachably attached to the handlebar of the stroller to enable the elongated handle to be removed and stored.

16. The apparatus of claim 10, wherein the elongated handle comprises the pneumatic valve to adjust the resistance element in one or more intervals.

17. The apparatus of claim 11, wherein the clamp of the elongated handle comprises a lever lock to secure the elongated handle to the stroller.

* * * * *